(12) United States Patent
Ovshinsky et al.

(10) Patent No.: US 6,519,951 B2
(45) Date of Patent: Feb. 18, 2003

(54) HYDROGEN-BASED ECOSYSTEM

(75) Inventors: Stanford R. Ovshinsky, Bloomfield Hills, MI (US); Rosa T. Young, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/871,449

(22) Filed: May 31, 2001

(65) Prior Publication Data

US 2001/0025670 A1 Oct. 4, 2001

Related U.S. Application Data

(60) Division of application No. 09/444,810, filed on Nov. 22, 1999, now Pat. No. 6,305,442, and a continuation-in-part of application No. 09/435,497, filed on Nov. 5, 1999, now Pat. No. 6,193,929.

(51) Int. Cl.[7] ................................................ F17C 11/00
(52) U.S. Cl. ........................................ 62/46.2; 62/46.1
(58) Field of Search .................................. 62/46.1, 46.2

(56) References Cited

U.S. PATENT DOCUMENTS 4,497,775 A  *  2/1985  MuMullen et al. ......... 422/159
5,778,972 A  *  7/1998  Sapru et al. ................. 165/104
6,033,506 A  *  3/2000  Klett ............................. 156/78
6,165,643 A  * 12/2000  Doyle et al. .............. 429/218.2

FOREIGN PATENT DOCUMENTS

JP          07048128      *   2/1995

* cited by examiner

*Primary Examiner*—Denise L. Esquivel
*Assistant Examiner*—Malik N. Drake
(74) *Attorney, Agent, or Firm*—David W. Schumaker; Marvin S. Siskind

(57) ABSTRACT

A complete infrastructure system for the generation, storage, transportation, and delivery of hydrogen which makes a hydrogen ecosystem possible. The infrastructure system utilizes high capacity, low cost, light weight thermal hydrogen storage alloy materials having fast kinetics. Also, a novel hydrogen storage bed design which includes a support/heat-transfer component which is made from a highly porous, high thermal conductivity, solid material such as a high thermal conductivity graphitic foam. Finally a material including at least one particle having atomically engineered local chemical and electronic environments, characterized in that the local environments providing bulk nucleation.

10 Claims, 14 Drawing Sheets

FIG - 5
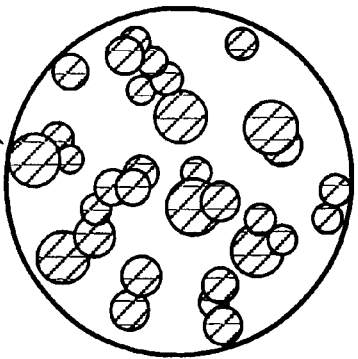
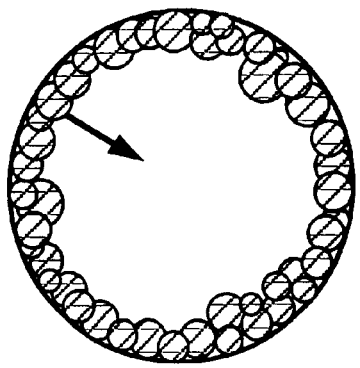
Absorption Kinetics
- Surface Catalytic Activity
  - Catalytic sites
  - Surface area
- Nucleation Density
  - Surface nucleation
  - Bulk nucleation
- Growth Rate
Bulk Nucleation
Surface Nucleation
$H_2 \rightarrow H+H$

HYDROGEN-BASED ECOSYSTEM

RELATED APPLICATIONS

This application is a divisional of application Ser. No. 09/444,810 filed on Nov. 22, 1999 now U.S. Pat. No. 6,305,442.

The instant applications is a continuation-in-part of U.S. application Ser. No. 09/435,497 entitled HIGH STORAGE CAPACITY ALLOYS ENABLING A HYDROGEN-BASED ECOSYSTEM", filed Nov. 5, 1999 for Ovshinsky et al. now U.S. Pat. No. 6,193,929.

FIELD OF THE INVENTION

The instant invention relates generally to a hydrogen based ecosystem made possible by revolutionary new hydrogen storage alloys that are able, for the first time to realistically use the most ubiquitous, ultimate source of fuel for the next millennium and beyond, hydrogen. More particularly, there is described the use of such hydrogen storage alloys integrated with a system that combines all the necessary attributes to solve not only the safe and efficient storage problem, but also the infrastructure problem. It enables transportation and delivery of hydrogen for, by way of example and not limitation, powering internal combustion engine or fuel cell vehicles. Generally the system is a hydrogen production/distribution system in which waste heat generated in any subsystem thereof is recovered and reused in other subsystems. This system is the most efficient manner of transporting and delivering hydrogen.

BACKGROUND OF THE INVENTION

The instant patent application for the first. time, describes a complete generation/storage/transportation/delivery system for a hydrogen-based economy. This is made possible by hydrogen storage alloys that have surmounted the chemical, physical, electronic and catalytic barriers that have heretofore been considered insoluble. These alloys are fully described in copending U.S. patent application Ser. No. 09/435,497, entitled "HIGH STORAGE CAPACITY ALLOYS ENABLING A HYDROGEN-BASED ECOSYSTEM", filed Nov. 5, 1999 for Ovshinsky et al. ("the '497 application"). The '497 application relates generally and specifically to alloys which solve the, up to now, unanswered problem of having sufficient hydrogen storage capacity with exceptionally fast kinetics to permit the safe and efficient storage of hydrogen to provide fuel for a hydrogen based economy, such as powering internal combustion engine and fuel cell vehicles. The instant invention in combination with the '497 application solves the twin basic barriers which have held back the use of the "ultimate fuel," namely hydrogen storage capacity and a hydrogen infrastructure. The infrastructure is here solved since there is now an acceptable storage material. With the use of such alloy, hydrogen can be shipped safely by boats, barges, trains, trucks, etc. when in solid form. The complete infrastructure system from "source to wheel" is the subject of the instant application. Such an infrastructure requires thermal management and efficient heat utilization throughout the entire system, and that is what has been accomplished herein.

In the '497 application the inventors for the first time disclosed the production of Mg-based alloys having both hydrogen storage capacities higher than about 6 wt. % and extraordinary kinetics. This revolutionary breakthrough was made possible by considering the materials as a system and thereby utilizing chemical modifiers and the principles of disorder and local order, pioneered by Stanford R. Ovshinsky (one of the instant inventors), in such a way as to provide the necessary catalytic local order environments, such as surfaces and at the same time designing bulk characteristics for storage and high rate charge/discharge cycling. In other words, these principles allowed for tailoring of the material by controlling the particle and grain size, topology, surface states, catalytic activity, microstructure, and total interactive environments for storage capacity.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide For nearly a century and a half, fuels with high amounts of carbon have progressively been replaced by those containing less. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today bums less than two-thirds as much carbon per unit of energy produced as it did in 1860, despite the fact that carbon based duels are still being used by the automotive industry.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities, among others, initially took the position that international treaties on climate change would cut economic growth and cost jobs. A dramatic shift has now occurred, in which the problems are acknowledged and efforts are now being made to solve them. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other. pollutants (despite its vehicular specific reductions in emissions), has now realized that change is necessary as evidenced by their electric and hybrid vehicles. In this field, the assignee of the subject invention, has developed the Ovonic nickel metal hydride battery, the enabling battery making electric and hybrid vehicles possible.

FIG. 1, taken from reliable industrial sources, is a graph demonstrating society's move toward a carbon-free environment as a function of time starting with the use of wood in the early 1800s and ending in about 2010 with the beginning of a "hydrogen" economy. In the 1800s, fuel was primarily wood in which the ratio of hydrogen to carbon was about 0.1. As society switched to the use of coal and oil, the ratio of hydrogen to carbon increased first to 1.3 and then to 2. Currently, society is inching closer to the use of methane in which the hydrogen to carbon ratio is further increased to 4 (methane has serious problems with safety, cost and infrastructure). However, the ultimate goal for society is to employ a carbon-free fuel, i.e., the most ubiquitous of elements, pure hydrogen. The obstacle has been the lack of solid state storage capacity and infrastructure. The inventors of the subject patent application and the '497 application have made this possible by inventing a 7% storage material (7% is an umoptimized fugure and will be increased along with better kinetics) with exceptional absorption/desorption kinetics, i.e. at least 80% charge in less than 2 minutes. These alloys allow for the first time, a safe, high capacity means of storing, transporting and delivering pure hydrogen, which is the subject of the instant application.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The instant patent application describes a complete generation/storage/transportation/delivery system for such a hydrogen based economy. For example, economical, lightweight, triple-junction amorphous silicon solar cells solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency, lightweight solar panels on nearby farms, in water, or on land. Also, the photovoltaic process for dissociating water to form hydrogen can be a step toward solving the problems of water purification throughout the world. Electricity can be generated to transport and pump the hydrogen into metal hydride storage beds that include the high storage capacity, lightweight metal hydride alloys. The ultra-high capacities of the alloys of the '497 application allow this hydrogen to be stored in solid form and transported by barge, tanker, train or truck in safe, economical form for ultimate use. Energy is the basic necessity of life and civilization for any society today and the use of hydrogen in the manner described herein as the basic source of energy would minimize the likelihood fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can, itself, be thought of as a giant hydrogen "furnace". Moreover hydrogen can be produced without the use of fossil fuels, such as by the electrolysis of water using nuclear or solar energy, or any other form of economical energy (e.g., wind, waves, geothermal, etc.). Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Thus, as shown in FIG. 2, compressed hydrogen at 5000 psi only has a hydrogen density of 31 g/liter. Additionally, large and very expensive compressors are required to store hydrogen as a compressed gas and compressed hydrogen gas is a very great explosion/fire hazzard.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day. Also, the storage density of liquid hydrogen, as shown in FIG. 2 is only 71 g/liter.

For the first time, storage of hydrogen as a solid hydride, using the atomically engineered alloys of the instant application can provide a greater percent weight storage than storage as a compressed gas or a liquid in pressure tanks. Also, hydrogen storage in a solid hydride is safe and does not present any of the safety problems that hydrogen stored in containers as a gas or a liquid does because hydrogen, when stored in a solid hydride form, exists in it's lowest free energy state. As shown, again in FIG. 2, storage of hydrogen in a 7% Ovonic thermal hydrogen storage alloy provides a hydrogen density of 103 g/liter, more than 3 times the density of compressed hydrogen gas.

In addition to the problems associated with storage of gaseous or liquid hydrogen, there are also problems associated with the transport of hydrogen in such forms. For instance transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use, and this is assuming the construction material of these existing pipelines will be suited to hydrogen transportation.

Thus, there remains a compelling and crucial a need in the art for a complete infrastructure system for the generation/storage/transportation/delivery of hydrogen which overcomes the limitations of the prior art.

SUMMARY OF THE INVENTION

The instant invention provides a complete infrastructure system for the generation/storage/transportation/delivery of hydrogen which in turn makes a hydrogen ecosystem possible. This infrastructure system must be highly energy efficient, and such is achieved utilizing high capacity, low cost, light weight Ovonic thermal hydrogen storage alloy materials having fast kinetics. Generally the system is a hydrogen production/distribution system in which waste heat generated in any subsystem thereof is recovered and reused in other subsystems. Thus, the thermal energy budget for the entire system is optimized for the most efficient use of heat energy. The system includes the following subsystems: 1) power generation; 2) hydrogen generation; 3) hydrogen purification/compression; 4) hydrogen storage in hydride bed; 5) hydride bed transportation via truck, train, boat, barge, etc.; 6) a hydrogen distribution network; and 7) hydrogen end use. Throughout this infrastructure heat of hydride formation is recovered for reuse, such as for releasing hydrogen from a source hydride bed or for hydrogen/power generation.

The hydrogen is stored in a magnesium based hydrogen storage alloy powder. These alloys, for the first time make it feasible to use solid state storage and delivery of hydrogen to power a hydrogen based economy, and particularly to power mobile energy consumer applications such as internal combustion engine or fuel cell vehicles. The alloy contains greater than about 90 weight % magnesium and has a) a hydrogen storage capacity of at least 6 weight %; b) absorption kinetics such that the alloy powder absorbs 80% of it's total capacity within 5 minutes at 300° C.; c) a particle size range of between 30 and 70 microns; and d) a proper microstructure. More preferably the alloy powder has a hydrogen storage capacity of at least 6.5 weight % and most preferably at least 6.9 weight %. Also, the alloy powder more preferably absorbs 80% of it's total capacity within 2 minutes at 300° C. and most preferably within 1.5 minutes. Modifiers elements added to the magnesium to produce the alloys mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon. Also, optionally, a small amount (up to 1%) of light elements such as carbon and/or boron, may be added to the alloy to increase the number of catalytically active sites therein.

The instant invention also provides a novel hydride storage bed design for the storage of hydrogen in a hydrogen storage alloy. The bed includes a unique support/heat-transfer component, which is made from a highly porous, high thermal conductivity, solid material. The preferred material is a high thermal conductivity graphitic foam.

The instant invention further provides a material including at least one particle having atomically engineered local chemical and electronic environments, characterized in that the local environments providing bulk nucleation.

BRIEF DESCRIPTION OF THE DRAWINGS

FIG. 5 is a graphical, stylistic depiction of the characteristics required by hydrogen storage alloys in order for such alloys to have the desired kinetic properties, specifically depicted is surface versus bulk nucleation;

DETAILED DESCRIPTION OF THE INVENTION

Figure 1:
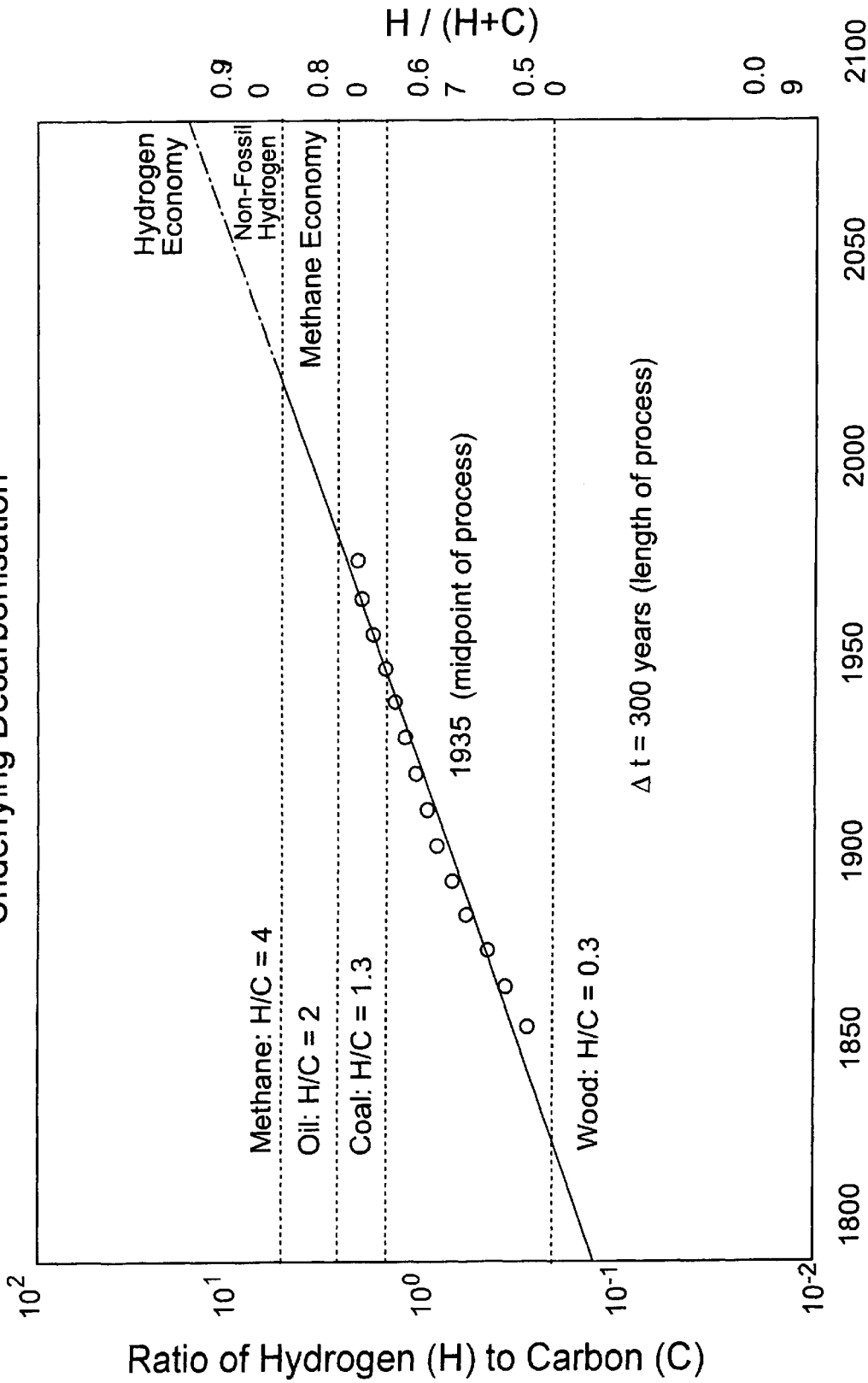
FIG. 1 is a graph having time plotted on the abscissa and the H/C ratio plotted on the ordinate, said graph demonstrating the movement of society toward carbon-free sources of fuel.
Figure 2:
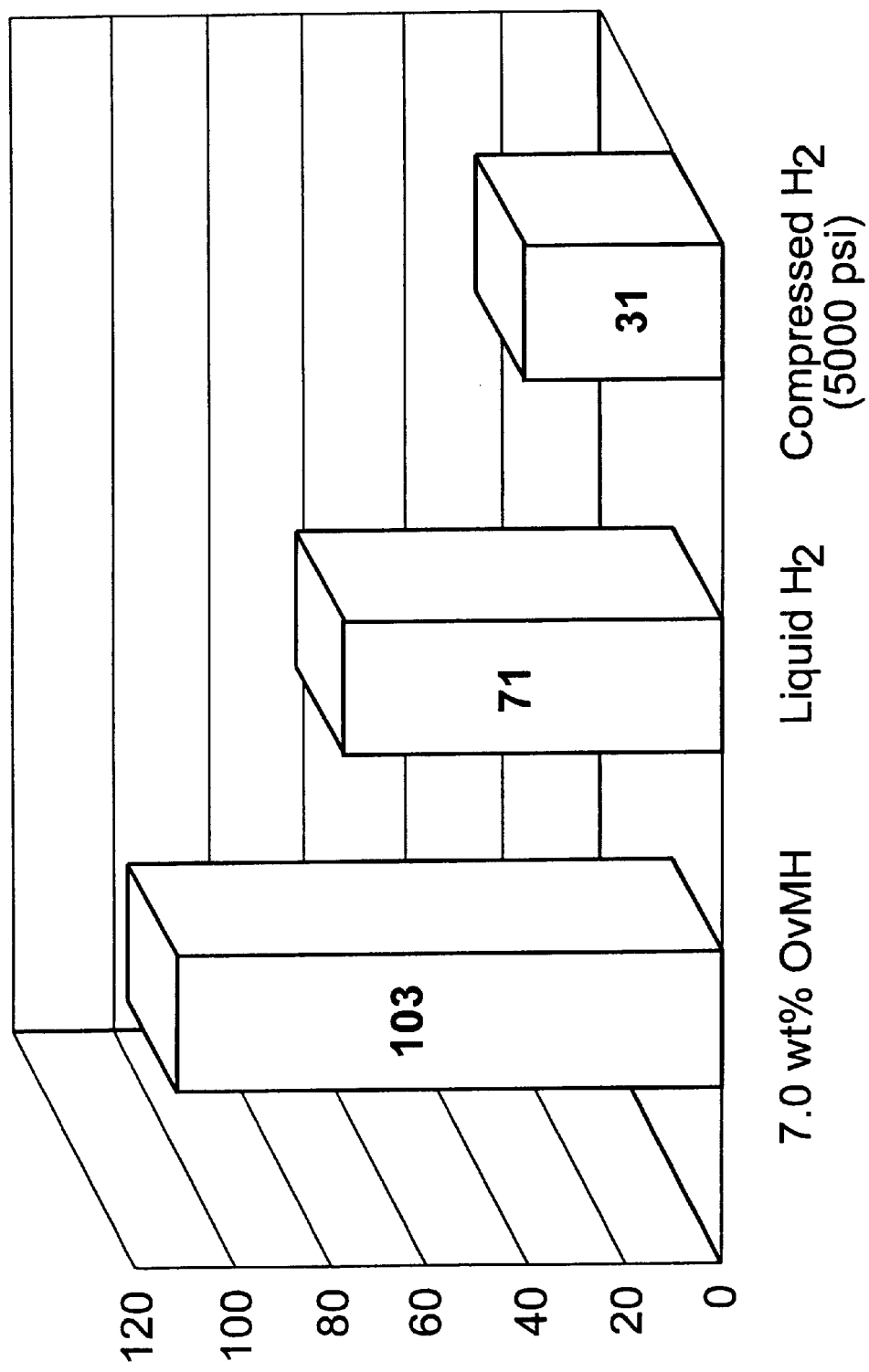
FIG. 2 is a graphical bar-chart of hydrogen storage density in g/liter for hydrogen stored as a compressed hydrogen, liquid hydrogen, and a 7% Ovonic solid hydride storage material.
Figure 3:
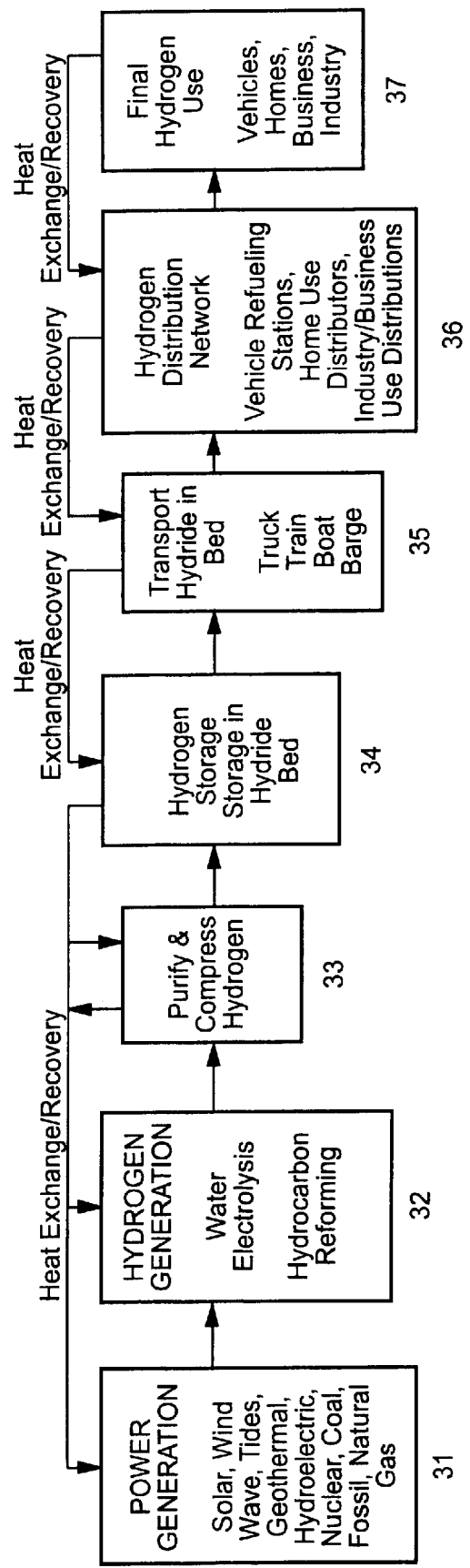
FIG. 3 is a stylistic depiction of the complete infrastructure system for the generation/storage/transportation/delivery of hydrogen of the instant invention.

Generally the system is a hydrogen production/distribution system in which waste heat generated in any subsystem thereof is recovered and reused in other subsystems. Thus, the thermal energy budget for the entire system is optimized for the most efficient use of heat energy. FIG. 3 is a stylistic depiction of the complete infrastructure system for the generation/storage/transportation/delivery of hydrogen of the instant invention, which in turn makes a hydrogen ecosystem possible. In order for this infrastructure system to be highly energy efficient, high capacity, low cost, lightweight Ovonic thermal hydrogen storage alloy materials having exceptionally fast kinetics are used to store the hydrogen. The system includes the following subsystems: 1) power generation 31; 2) hydrogen generation 32; 3) hydrogen purification/compression 33; 4) hydrogen storage in hydride beds 34; 5) hydride bed transportation via truck, train, boat, barge, etc. 35; 6) a hydrogen distribution network 36; and 7) hydrogen end use 37. Throughout this infrastructure heat of hydride formation (i.e., $M+H_2 \rightarrow MH+heat$) is recovered for reuse, such as for releasing hydrogen from a source hydride bed or for hydrogen/power generation. As used herein, the term "waste heat" will refer generally to any form of useable heat generated in any of the processes of the infrastructure that would normally be lost or discarded to the surrounding environment.

Heat Exchange/Thermal Recovery

As alluded to above, one very important aspect within and throughout the entire infrastructure system and all of it's subsystems, is the recovery and reuse of heat generated by many of the processes involved. This greatly reduces the additional energy burden for heating the hydride beds to release the stored hydrogen and makes efficient use of waste heat, thus eliminating the need to release the heat into the environment.

One such heat recovery is available in the combination of subsystems 31, 32, 33 and 34. The first place heat can be recovered is from the exothermic hydride reaction that occurs in subsystem 34 when the hydrogen is stored in the hydride bed. The waste heat can be transferred to the other subsystems as needed, for example to generate power in subsystem 31 or to produce hydrogen in subsystem 32 or as needed to compress or purify the hydrogen in subsystem 33. Also, any excess heat in the purification and compression of hydrogen in subsystem 33 can be transferred to subsystems 31 or 32.

The next place for heat recovery is in the hydrogen transfer from subsystem 34 to subsystem 35. This assumes that the hydrogen is stored in stationary storage tanks in subsystem 34 and is transferred to mobile tanks for transportation in subsystem 35. The heat of hydride formation in subsystem 35 can be used to heat up the hydride beds of subsystem 34 to release the stored hydrogen.

Further heat recovery can be employed in the hydrogen transfer from subsystem 35 to subsystem 36. Once again this assumes that the hydrogen is stored in the mobile tanks of subsystem 35 is transferred to stationary tanks at the distribution network in subsystem 36. The heat of hydride formation in subsystem 36 can be used to heat up the hydride beds of subsystem 35 to release the stored hydrogen.

Finally, heat can be recovered in the hydrogen transfer from subsystem 36 to subsystem 37. The heat of hydride formation in subsystem 36 can be used to heat up the hydride beds of subsystem 35 to release the stored hydrogen. Assuming of course that there is a local transfer of hydrogen from one subsystem to another and not a local pipeline distribution of hydrogen.

The most useful and simplest way to perform this heat exchange (i.e. cool the hydride bed as absorption is occurring) is via high-flow-rate hydrogen gas cooling. Thus, as hydrogen is being absorbed by the hydride bed, an excess of hydrogen gas is flowing through the bed to carry away the heat of hydride formation. This method of cooling/heat transfer, simplifies bed designs, and separate cooling medium channels are not required. It does pose one possible problem (which will be overcome via bed designs herein below), namely the problem of entrainment of hydrogen storage materials in the high-rate hydrogen gas flow. With the bed designs described below, this problem is overcome.

The Power Generation Subsystem 31

The first step in the hydrogen generation/storage/transportation/delivery system is the generation of power. No matter how the hydrogen is produced, some source of power is needed. Examples of "non-polluting" sources of power include wind power, solar power, geothermal power, wave power, hydroelectric power, and ocean thermal energy conversion (OTEC) power. Other sources of power include creation of power via the combustion of hydrocarbons or fossil fuels such as coal, oil, and natural gas and nuclear power. Any individual means or combination thereof could suffice to produce the power needed. The most convenient form of power to produce would typically be electrical, because electrical energy is easily converted into other forms of energy and is useful in direct electrolysis of water to form hydrogen and oxygen.

The most useful means to create the power is via solar energy. For example, economical, light weight, triple-junction amorphous silicon solar cells solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds.

The Hydrogen Generation Subsystem 32

Once power has been generated in the power generation subsystem 31, at least a portion of the power is then used to generate hydrogen. The presently used concepts for hydrogen production on a commercial basis are steam reforming of natural gas, partial oxidation of oil products and electrolysis of water. Of these systems, the preferred method (although presently not the most economical method) is the electrolysis of water. This method is preferred because the starting materials are water and electricity, both of which are completely renewable, since the byproduct of hydrogen "burning" is water, and electricity can be produced from renewable sources of energy (i.e., solar, wind, geothermal, waves, etc.). Reformation or partial oxidation of hydrocarbons, on the other hand, uses a depletable hydrocarbon source, along with thermal energy and water.

One useful type of electrolysis is solid polymer electrolyte electrolysis. This method is expected to be highly efficient and have lower cost than conventional hydrogen production methods. The polymer ion exchange membrane is used as the electrolyte and the electrodes are directly attached to the membrane. Using this technique, high energy efficiency can be achieved. Using pure water as circular fluid without alkali makes it easier to maintain equipment than conventional alkaline water electrolysis methods.

Another method of producing hydrogen is via photoelectrolysis. The generation of hydrogen using a photoanode in an electrochemical cell requires at least one counter electrode in an electrolyte. The electrochemical cell can utilize either a photocathode or a conventional metal cathode with the photoanode. The electrolyte may be either acidic or alkaline. When the electrolyte is acidic, the reaction at the counter electrode is:

$$2H^+ + 2e^- \rightarrow H_2 \qquad (a)$$

This reaction proceeds in the dark as sufficient electrons are available. At the photoanode, the reaction is:

$$H_2O + 2H^+ \rightarrow 2H^+ + \tfrac{1}{2}O_2 \qquad (b)$$

When the electrolyte is alkaline, the reaction at the counter electrode is:

$$H_2O + e^- \rightarrow \tfrac{1}{2}H_2 + OH^- \qquad (c)$$

and the reaction at the photoanode is:

$$2OH^- + 2H^+ \rightarrow H_2O + \tfrac{1}{2}O_2 \qquad (d)$$

As an example, when an n-type semiconductor photoanode is exposed to light, the electrons are excited from the valence band to the conduction band, thereby creating holes in the valence band and free electrons in the conduction band. The electrons produced at the photoanode are conducted by means of an external electrical connection to the counter electrode where the electrons combine with hydrogen ions of water molecules in the electrolytic solution to produce hydrogen gas. At the photoanode, the electrons are provided from the hydroxyl ions in the solution to fill the holes created by the excited electrons of the photoanode and evolve oxygen.

To create a good charge separation between the electrons and holes at the photoanode, a positive potential, for example, 0.5 volts, is applied to bend the conduction and valence bands. This creates a field to prevent electrons excited to the conduction band from recombining with the holes created in the valence band upon the absorption of light energy. The bank bending also tends to direct the excited electrons into the electrical circuit and the holes to the surface of the photoanode where they can combine more readily with hydroxyl ions provided by the electrolyte.

By selecting a semiconductor with a conduction band level more negative than the $H_2O/H_2$ energy level, the electrolysis of water can be accomplished solely through the use of solar energy. At least a portion of the electrode potential of the reaction can be supplied by light to reduce the energy required from an external power source.

For optimum efficiency, the semiconductor utilized for the photoanode should have a band gap in the approximate range of 1.5 to 1.7 eV with a Fermi level which is compatible with the electrolytic solution. For an n-type semiconductor, the water electrolysis process proceeds best when the semiconductor has a band gap slightly greater than 1.5 eV. A small work function is also desirable so that electrons diffuse into the water to attain thermal equilibrium. This causes the energy bands of the semiconductor to bend up near the interface of the electrolyte. The incident light is then absorbed in the semiconductor creating electron-hole pairs.

The photoexcited holes are accelerated towards the semiconductor-electrolyte interface by the internal field. When holes are injected into the water at the correct energy, oxygen is evolved near the photoanode and hydrogen is evolved near the counter electrode according to the reactions previously described in equations a and b, or c and d, depending upon whether an acidic or alkaline system is utilized. Specific photoelectrodes for use in such a photoelectrolysis system are described in U.S. Pat. Nos. 4,511,638 and 4,656,103, both assigned to the assignee of the instant invention, the disclosures of which are hereby incorporated by reference.

The Hydrogen Purification and Compression Subsystem 33

Once hydrogen has been produced in the hydrogen generation subsystem, it needs to be purified (i.e. harmful, or inert components need to be removed), and compressed for storage. The most useful way to purify the hydrogen is to pass it through a selective hydrogen filter. Typical filters alloy hydrogen to pass through, but prevent any other gases from passing through. Filters of this sort can be made from Pd alloys, or more preferentially (due to cost considerations) from low cost hydrogen storage materials. That is, conventional filters are very expensive and can easily be replace with Ovonic hydrogen storage materials, which are low cost and efficiently filter hydrogen out of gas streams. In addition to such a filter, other useful components of a hydrogen purifier may include oxygen and/or water scavengers.

Figure 4:
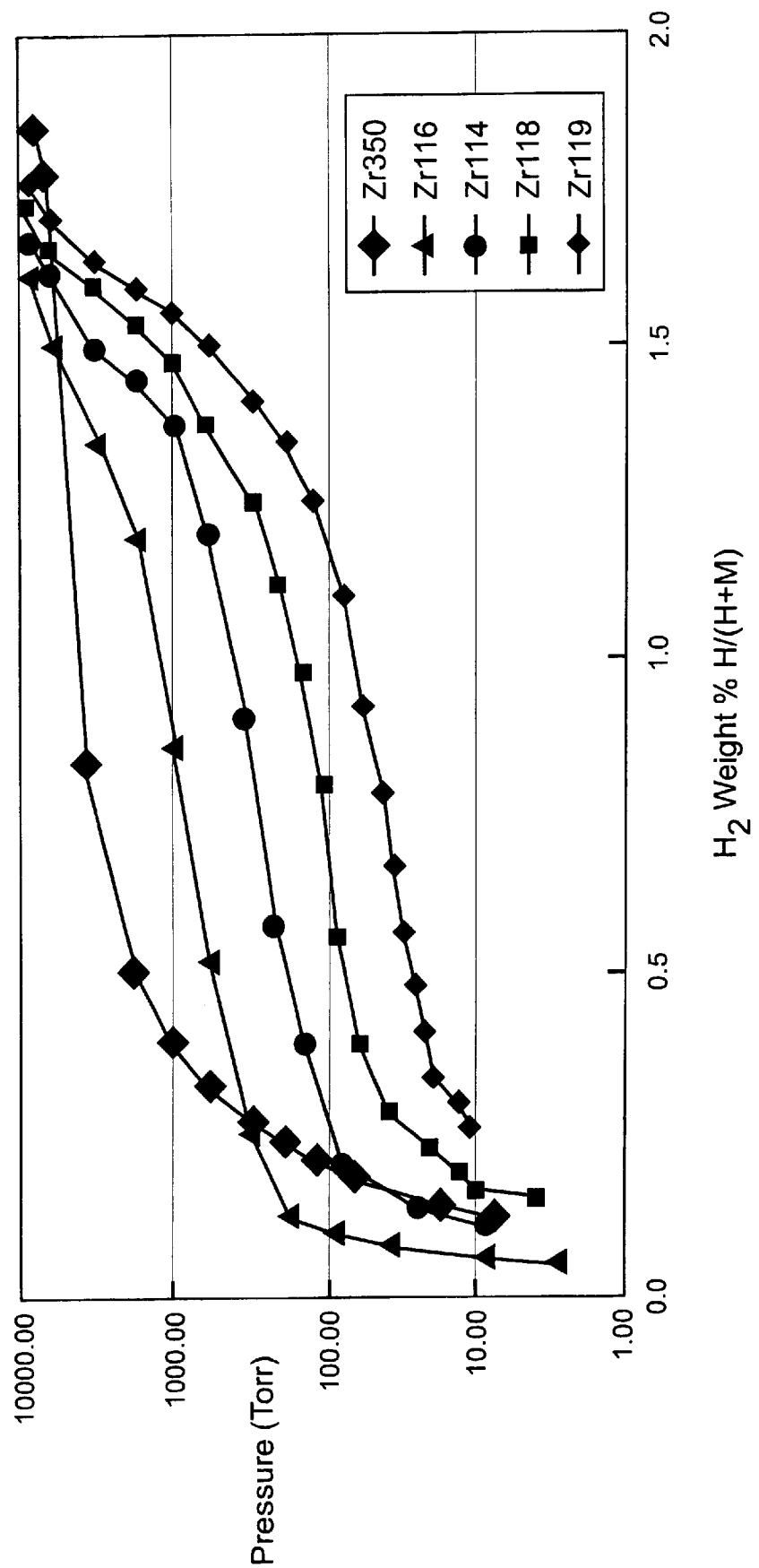
FIG. 4 is a graphical representation pressure-composition-temperature curves for a family of various Ovonic hydrogen storage alloys at 30° C., these alloys are useful for compressing/pumping the hydrogen of the instant infrastructure.

As for compression, the hydrogen may be compressed via conventional mechanical compressors which are adapted for hydrogen use or preferentially the hydrogen can be compressed using nonmechanical hydride compressors/pumps. An example of such a hydride compressor is disclosed in U.S. Pat. No. 4,085,590 to Powell, et al., issued Apr. 25, 1978. FIG. 4 is a pressure-composition-temperature (PCT) plot for a family of various Ovonic hydrogen storage alloys at 30° C. These alloys can be used individually to compress hydrogen by adsorbing the hydrogen at a low temperature and desorbing the hydrogen at a higher temperature and pressure, thereby increasing the pressure of (compressing) the hydrogen. The alloys can also be used in combination to create a staged compressor which works on the same principle but allows for higher compression than any single alloy alone. Using combinations of these Ovonic hydrogen storage alloys, The Hydrogen Storage Subsystem 34

Once the hydrogen has been purified and compressed in subsystem 33, the hydrogen needs to be stored. As discussed above, the most economical and safest method for storing the hydrogen is in the form of a solid hydride. Previous to the invention of the '497 application, this form of storage was uneconomical and unfeasible because of the low storage capacity and/or the poor kinetics of the prior art alloys. However, with the advent of the 7% storage capacity alloys of the '497 application, which exhibit exceptional kinetics, this form of storage preferred. The alloys are typically contained in "bed" form in a storage tank. The hydrogen is pumped into the storage tank and absorbed by the hydride alloy, which then stores the hydrogen until it is needed.

In general the preferred alloys contain greater than about 90 weight % magnesium, and contain at least one modifier element. The at least one modifier element creates a magnesium based alloy which is capable of storing at least 6 weight % hydrogen and which is capable of absorbing at least 80% of the full storage capacity of hydrogen in under 5 minutes at 300° C. More preferably the modified alloy stores at least 6.5 weight % hydrogen and is capable of absorbing 80% of the full storage capacity of hydrogen in under 2 minutes at 300° C. Most preferably the modified alloy stores at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce, La, Pr, and Nd). The alloy may also contain one or more of 3–7 weight % Al, 0.1–1.5 weight % Y and 0.3–1.5 weight % silicon. Also, optionally, a small amount (up to 1%) of light elements such as carbon and/or boron, may be added to the alloy to increase the number of catalytically active sites therein. A few examples will help to illustrate the preferred hydrogen storage alloys.

EXAMPLE 1

A modified Mg alloy having the designation FC-10 was made which has the composition: 91.0 wt. % Mg, 0.9 wt. % Ni, 5.6 wt. % Al, 0.5 wt. % Y and 2.0 at % Mm. The individual raw alloying elements were mixed in a glove box. The mixture was placed in a graphite crucible and the crucible was placed in a furnace. The crucible had a 2.0 mm boron nitride orifice at the bottom thereof which is plugged by a removable boron nitride rod. The furnace was pumped down to very low pressure and purged three times with argon. The argon pressure withing the furnace was brought up to 1 psi and kept at this pressure as the crucible was heated to 600° C. Once the melt was ready, the boron nitride rod was lifted and argon was injected into the furnace under pressure. The molten alloy flowed out of the graphite crucible through the boron nitride orifice and onto a non-water-cooled, horizontally spinning, copper wheel. The wheel, which spins at about 1000 rpm, solidifies the molten alloy into particles which then bounce off a water-cooled copper cap which covers the spinning wheel, and drop into a stainless steel pan where they gradually cool. Five grams of the solidified alloy flakes were mixed with 100 mg of graphite grinding aid. The mixture was mechanically ground for 3 hours. The ground alloy was then classified by sieving to recover material having a particle size of between 30 and 65 microns. This alloy has a storage capacity of about 6.5 wt. % hydrogen and absorbs 80% of the maximum capacity in less than 5 minutes at a temperature of about 300° C. Other details of the alloy properties are presented below.

EXAMPLE 2

A modified Mg alloy having the designation FC-76 was made which has a composition: 95.6 wt. % Mg, 1.6 wt. % Ni, 0.8 wt. % Si and 2.0 wt % Mm. The alloy was formed in the same manner as Example 1, however, the furnace temperature was 850° C. and the orifice size was 2.5 mm. This alloy has a storage capacity of about 6.9 wt. % hydrogen and absorbs 80% of the maximum capacity in less than 1.5 minutes at a temperature of about 300° C. Other details of the alloy properties are presented below.

EXAMPLE 3

A modified Mg alloy having the designation FC-86 was made which has a composition: 95 wt. % Mg, 2 wt. % Ni and 3.0 wt % Mm. The alloy was formed in the same manner as Example 1, however, the furnace temperature was 750° C. and the wheel speed was 1400 rpm. This alloy has a storage capacity of about 7 wt. % hydrogen and absorbs 80% of the maximum capacity in less than 2.3 minutes at a temperature of about 275° C. Other details of the alloy properties are presented below.

The preferred hydrogen storage alloys are unique in their combination of high storage capacity and excellent absorption/desorption kinetics. A combination of both alloy composition and particle size of the hydrogen storage material have a significant effect on the kinetics. That is, the kinetics of the material (regardless of specific composition) improve with decreasing particle size. Specifically, materials having a particle size under 70 microns are the most useful. More specifically, a 30–70 micron particle size gives excellent kinetics while still being capable of being easily manufactured. Increasing particle size eases manufacturing, but drastically reduces the kinetics of the material, while decreasing particle size via grinding is difficult because of the high ductility of these Mg based alloys. In fact, the use of gas atomization may be required in industry to manufacture bulk quantities of the particulate alloy specifically because the alloys are too ductile to be ground efficiently. One other important point to note about the instant alloys is that, even when hydrided, these finely ground powders do not self-ignite and burn in air, in contradistinction to pure magnesium hydride powders. However, if desired, a mono-atomic layer of a material which protects the particles but passes hydrogen (such as carbon, nickel or a polymeric material) may be coated thereon.

FIG. 5 is a graphical, stylistic depiction of the characteristics required by hydrogen storage alloys in order for such alloys to have the required kinetic properties required to propel fuel cell and internal combustion engines and schematically illustrates these concepts. Specifically, FIG. 5 shows how bulk nucleation, in addition to surface nucleation can increase the number of catalytic site for the dissociation of $H_2$ into 2H. Also, since particles having only surface nucleation sites will first adsorb hydrogen in the surface layer thereof, a sort of "barrier" is created on the surface which slows the further absorption of hydrogen. Thus, what is needed is a way to bypass this surface "barrier" and allow for absorption of hydrogen directly into the interior of the particle.

Small particles have unique properties that bridge the gap between crystalline and amorphous solids, i.e. small geometry gives rise to new physics. It is to be noted that 50 Angstrom particles are "mostly surface," thereby giving rise to new topologies and unusual bonding configurations. Also, 21% of all atoms in a 50 Angstrom particle are on the surface and another 40% are within one atom of the surface. Thus compositional disorder in multi-element micro-alloys is large in small particles, e.g. in a 50 Angstrom particle, each element in a 10 element alloy will show 3% variation in concentration just due to statistics. With such small particles, quantum confinement effects are apparent and band structure effects are disturbed.

This ability to atomically engineer the local chemical and electronic environments allows these environments to provide bulk nucleation within the particles. The instant inventors have found that, by applying the principles of atomic engineering and tailoring of the local chemical and electronic environment, magnesium can be modified to store more than 6 wt. % hydrogen, with significantly increased kinetics which allows for economic recovery of the stored hydrogen. The increased kinetics allows for the release of hydrogen at lower temperatures, thus increasing the utility of metal hydride storage in hydrogen based energy systems.

Thus the instant alloys provide commercially viable, low cost, low weight hydrogen storage materials.

Figure 6:
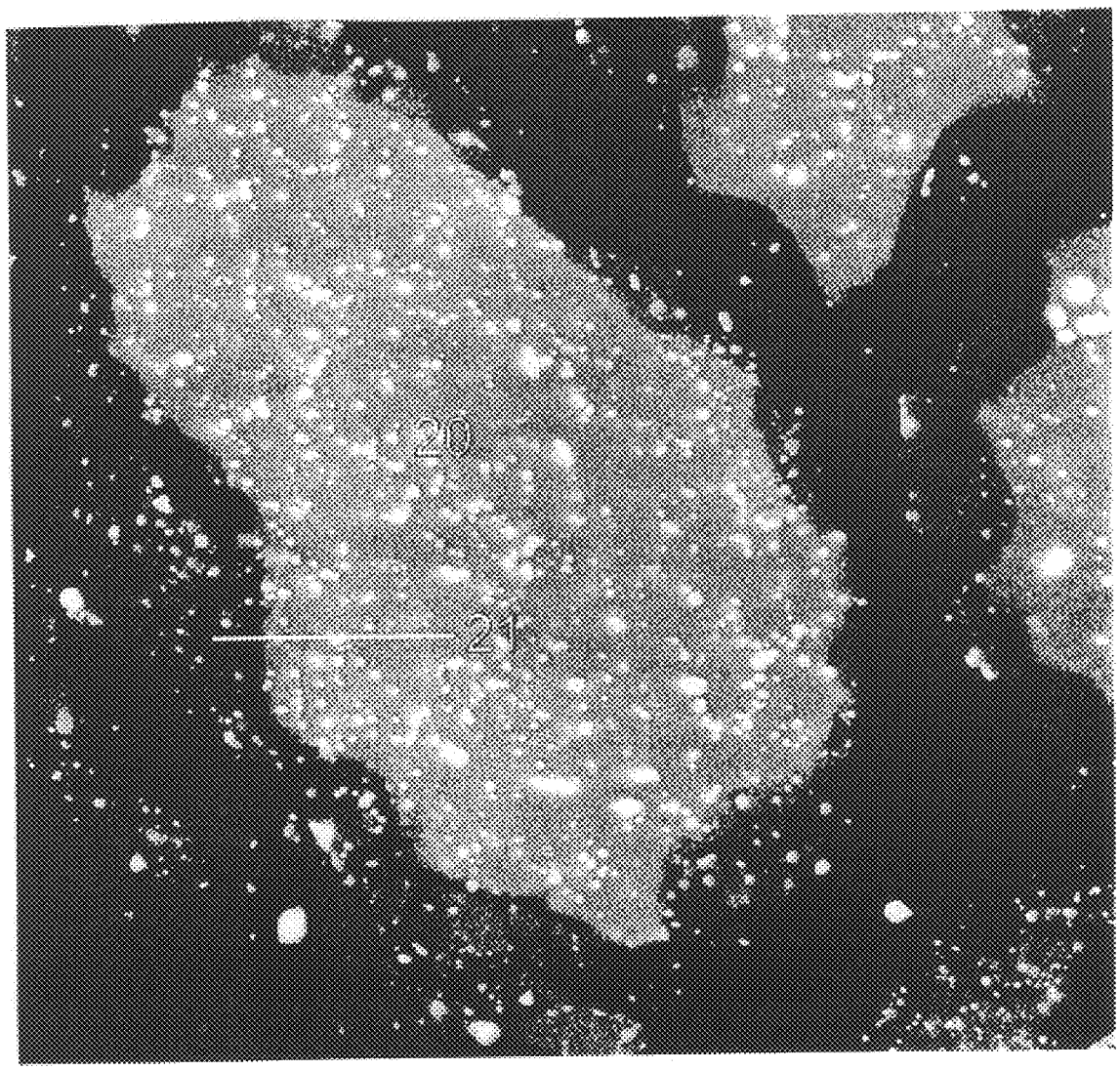
FIG. 6 is an SEM showing the effect of only surface nucleation on the hydriding of a magnesium based hydrogen storage alloy of the instant invention.

FIG. 6 is an SEM which confirms the effect of surface nucleation on hydriding of a magnesium based hydrogen storage alloy. The material in FIG. 6 initially only absorbs hydrogen at the surface nucleation sites there and hydrogen must thereafter diffuse into the interior or the particle. Specifically FIG. 6 shows a particle 20 in which only surface hydriding (nucleation) occurs 21. It should be noted that in FIGS. 6 and 7, the lighter areas are the non-hydrided portions of the material, while the darker areas are the hydrided portions of the material.

Figure 7:
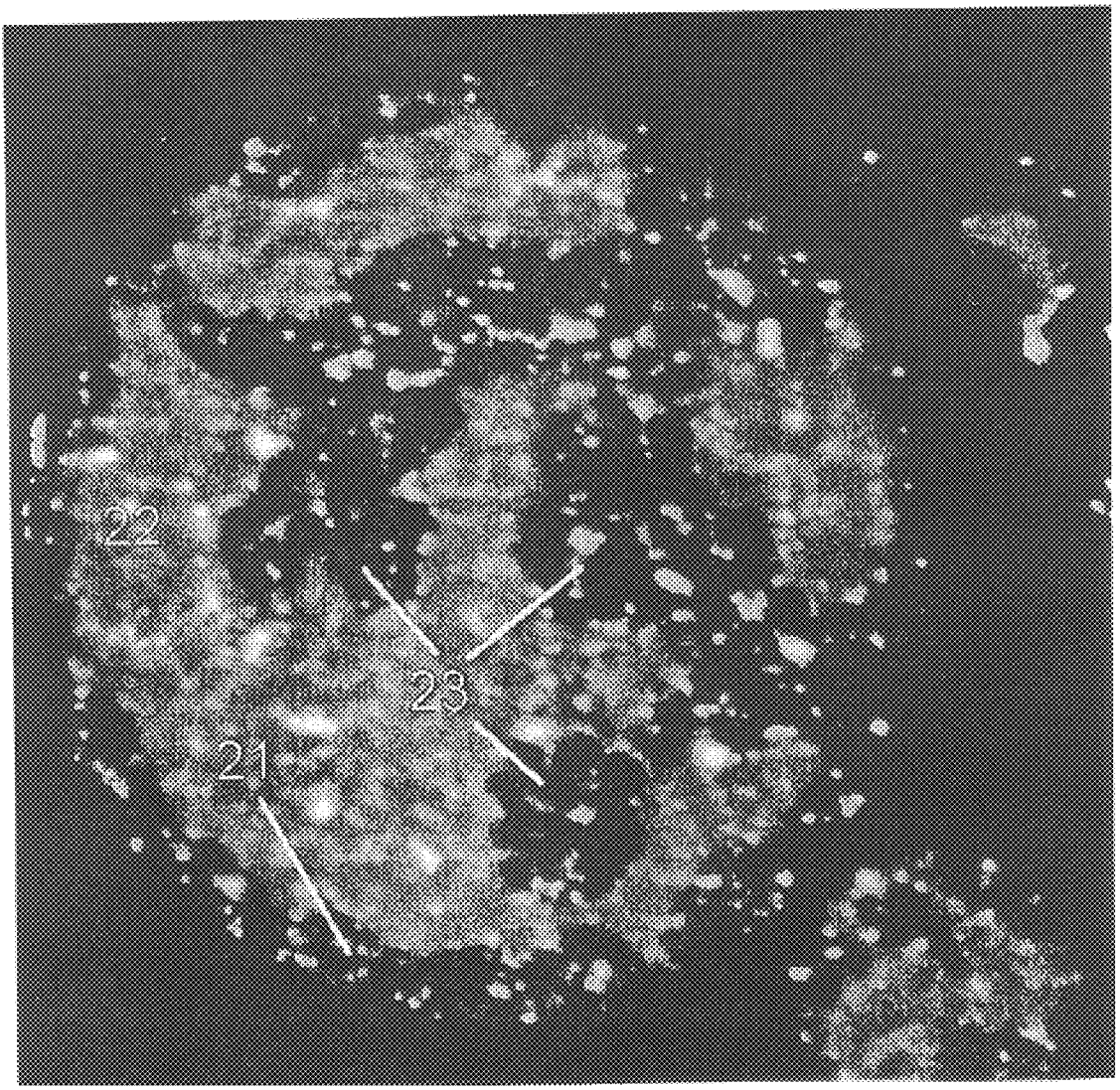
FIG. 7 is an SEM showing the effect of bulk nucleation on the hydriding of a magnesium based hydrogen storage alloy of the instant invention.

FIG. 7, on the other hand, is an SEM which confirms the effects of bulk nucleation (and the associated catalytic sites). The material in FIG. 7 initially absorbs hydrogen at the bulk nucleation sites and therefore hydrogen can more readily be absorbed into the interior of the particle. Specifically FIG. 7 shows another particle 22, which shows hydriding (via catalytic nucleation sites) within the bulk 23.

While this atomic engineering of the local chemical and electronic environments to provide both surface and bulk nucleation has been applied to thermal hydrogen storage materials, it can also be applied to other materials to affect the properties. For instance it can be applied to hydrogen storage materials in general (i.e. electrochemical or thermal) and to materials in general. Specifically desirable materials will be multi-elemental materials which may have been rapidly quenched. They will typically have small crystallite size, under 100 Angstroms and be particulate materials under 100 microns in size.

Figure 8:
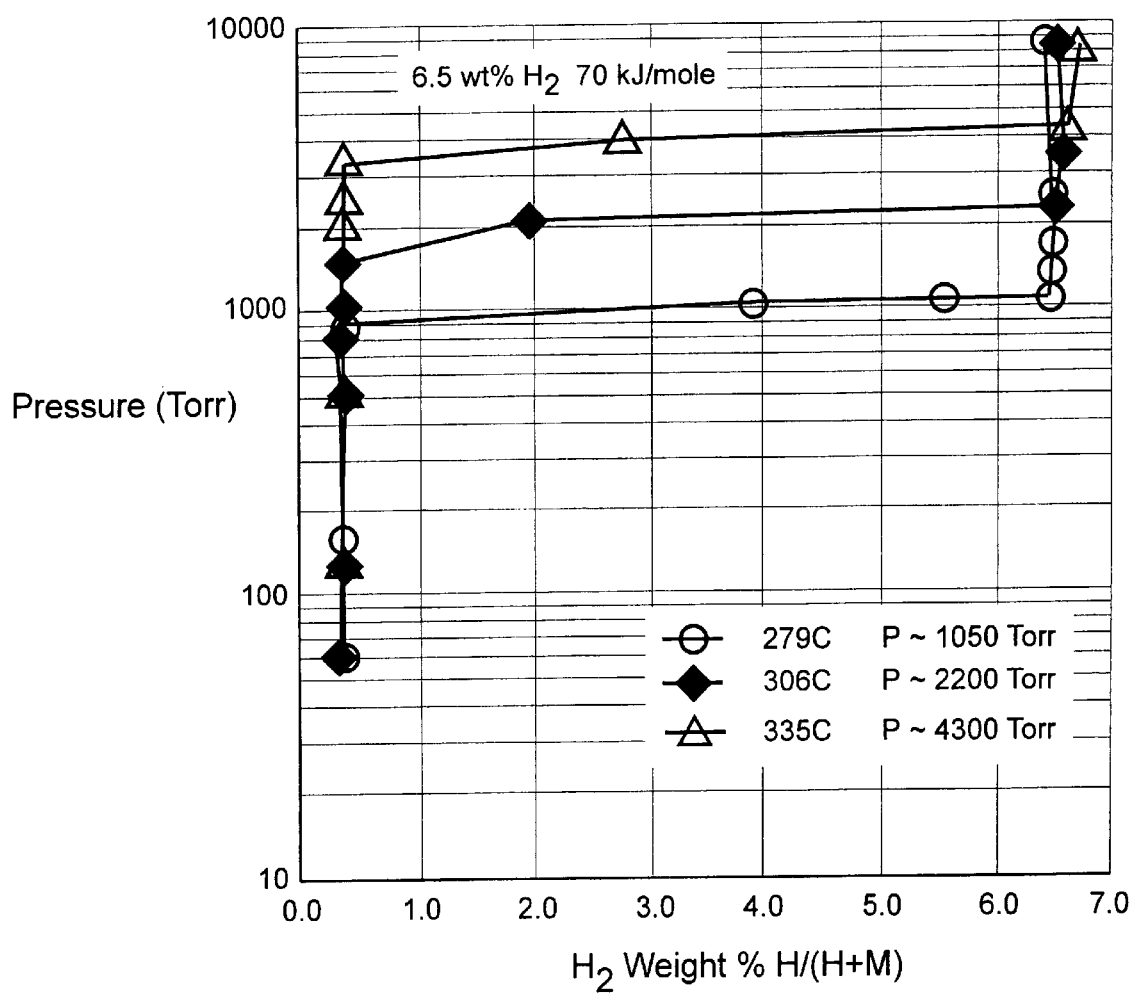
FIG. 8 is a graph of the Pressure Composition Temperature (PCT) curves of alloy FC-10 at 3 different temperatures.

FIG. 8 is a graph of the Pressure-Composition-Temperature (PCT) curves of alloy FC-10 at 279° C. (represented by the ○ symbol), 306° C. (represented by the ▲ symbol) and 335° C. (represented by the △ symbol). The graph shows that the alloy has plateau pressures of 1050 Torr at 279° C., 2200 Torr at 306° C. and 4300 Torr at 335° C. The PCT curve shows that the FC-10 alloy has a maximum capacity of about 6.5 weight % hydrogen, and a hydrogen bond energy of about 70 kJ/mole.

Figure 9:
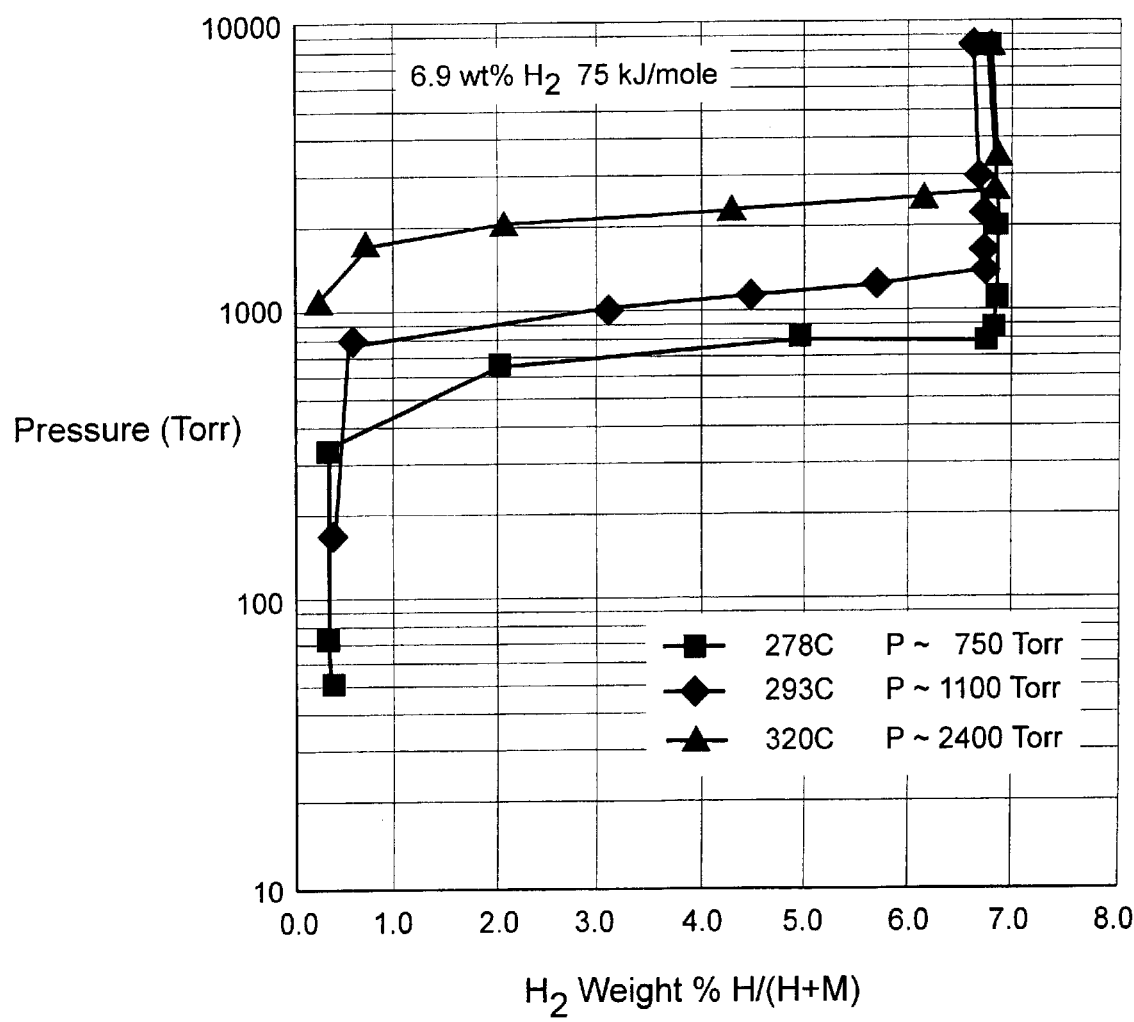
FIG. 9 is a graph of the PCT curves of alloy FC-76 at 3 different temperatures.

FIG. 9 is a graph of the PCT curves of alloy FC-76 at 278° C. (represented by the ■ symbol), 293° C. (represented by the ♦ symbol) and 320° C. (represented by the ▲ symbol). The graph shows that the alloy has plateau pressures of 750 Torr at 278° C., 1100 Torr at 293° C. and 2400 Torr at 320° C. The PCT curve shows that the FC-76 alloy has a maximum capacity of about 6.9 weight % hydrogen, and a hydrogen bond energy of about 75 kJ/mole.

Figure 10:
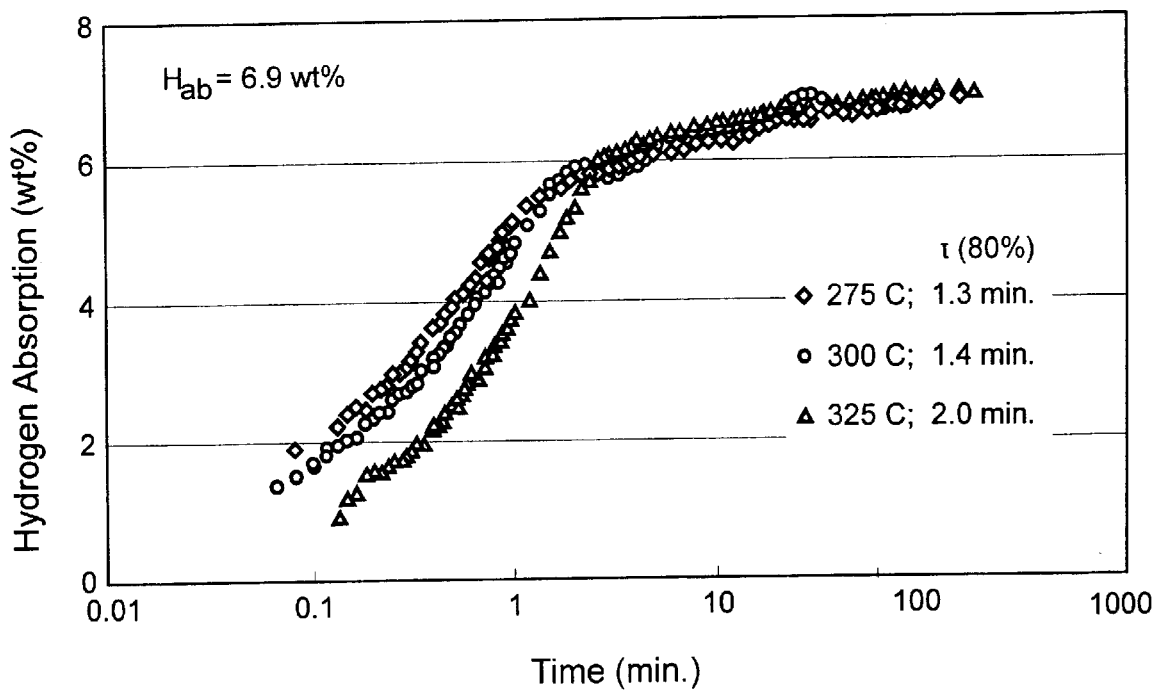
FIG. 10 is a plot of the absorption kinetics of the FC-76 alloy, specifically plotted is weight % hydrogen absorption versus time for 3 different temperatures.

FIG. 10 is a plot of the absorption kinetics of the FC-76 alloy. Specifically, weight % hydrogen absorption versus time is plotted for 3 temperatures 275° C. (◇ symbol), 300° C. (○ symbol), and 325° C. (△ symbol). As can be seen, at 275° C. the alloy absorbs 80% of it's total capacity in 1.3 minutes, at 300° C. the alloy absorbs 80% of it's total capacity in 1.4 minutes, and at 325° C. the alloy absorbs 80% of it's total capacity in 2.0 minutes.

Figure 11:
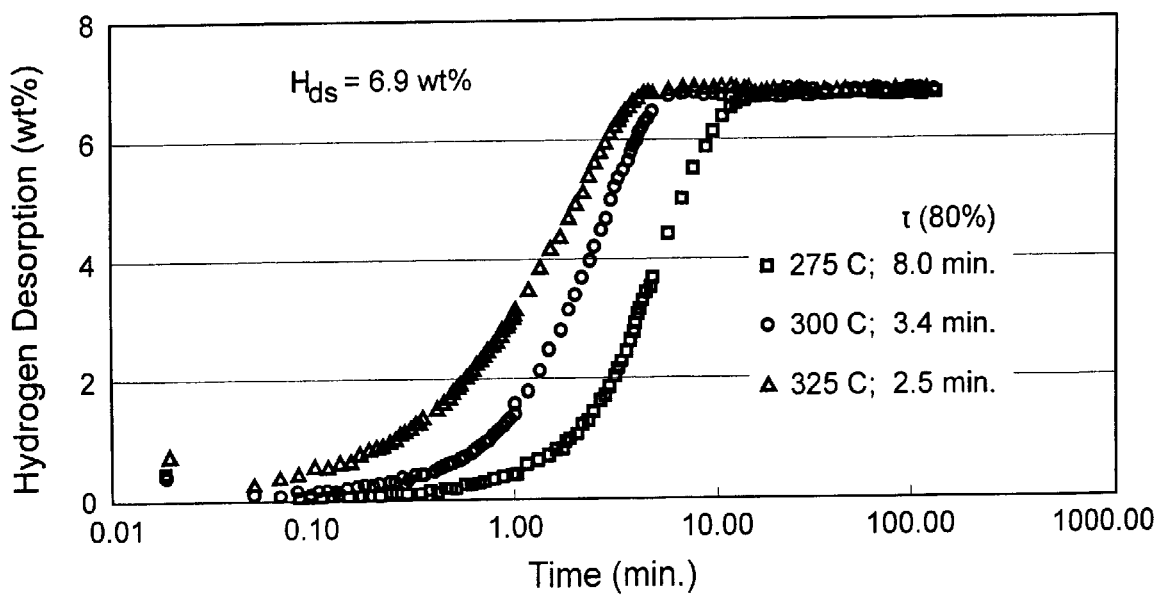
FIG. 11 is a plot of the desorption kinetics of the FC-76 alloy specifically plotted is weight % hydrogen desorption versus time for 3 different temperatures.

FIG. 11 is a plot of the desorption kinetics of the FC-76 alloy. Specifically, weight % hydrogen desorption versus time is plotted for 3 temperatures 275° C. (□ symbol), 300° C. (○ symbol), and 325° C. (△ symbol). As can be seen, at 275° C. the alloy absorbs 80% of it's total capacity in 8.0 minutes, at 300° C. the alloy desorbs 80% of it's total capacity in 3.4 minutes, and at 325° C. the alloy debsorbs 80% of it's total capacity in 2.5 minutes.

Figure 12:
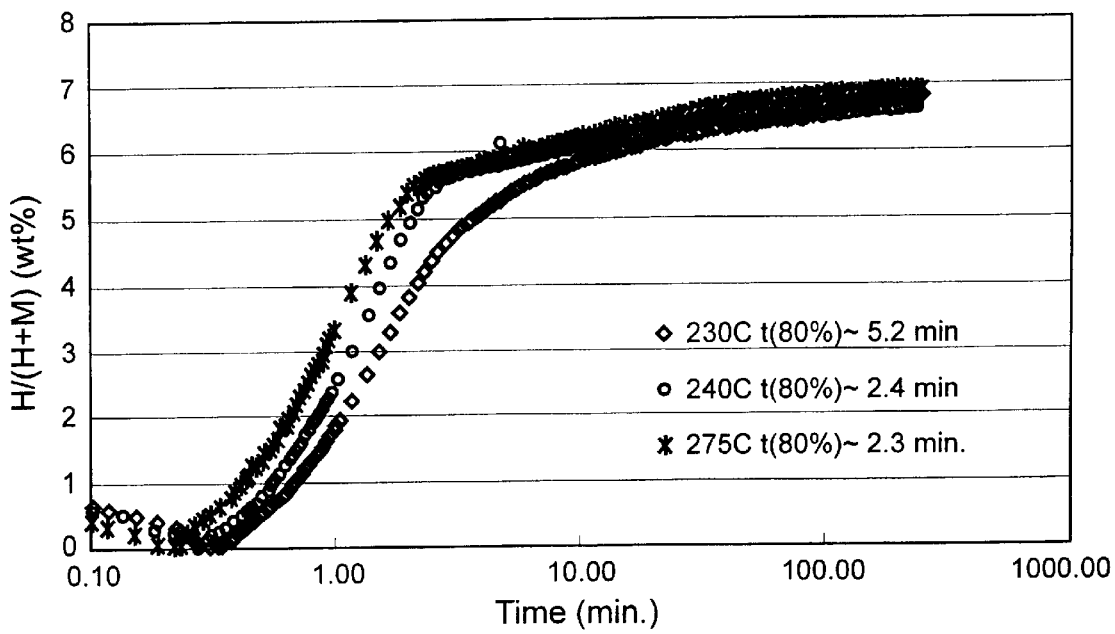
FIG. 12 is a plot of the absorption kinetics of the FC-86 alloy specifically plotted is weight % hydrogen desorption versus time for 3 different temperatures.

FIG. 12 is a plot of the absorption kinetics of the FC-86 alloy. Specifically, weight % hydrogen absorption versus time is plotted for 3 temperatures 230° C. (◇ symbol), 240° C. (○symbol), and 275° C. (* symbol). As can be seen, at 230° C. the alloy absorbs 80% of it's total capacity in 5.2 minutes, at 300° C. the alloy absorbs 80% of it's total capacity in 2.4 minutes, and at 325° C. the alloy absorbs 80% of it's total capacity in 2.3 minutes.

Figure 13:
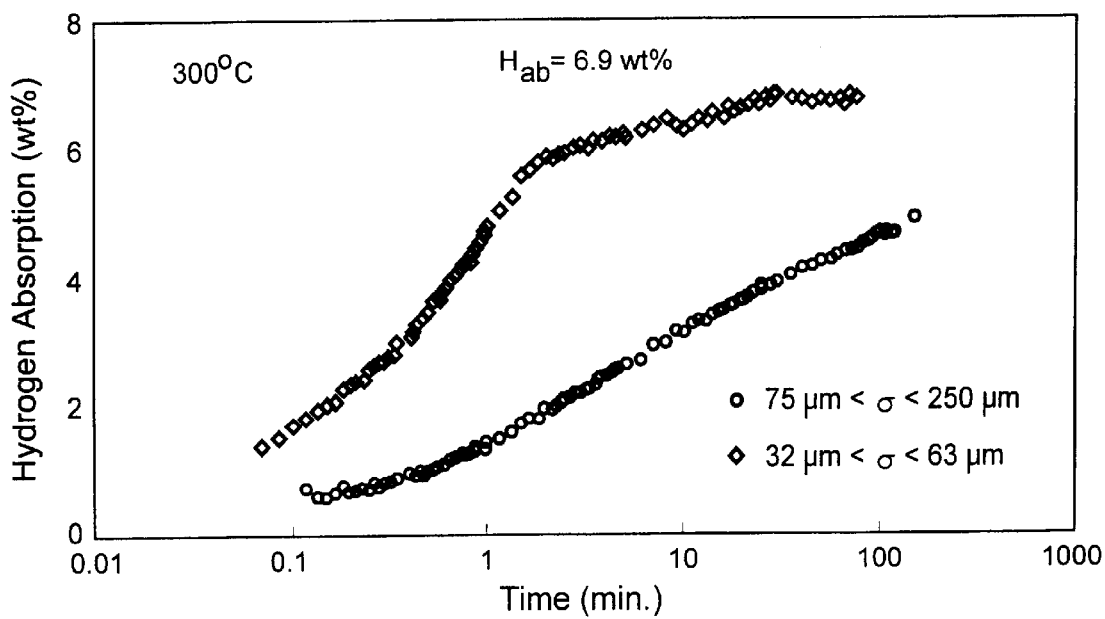
FIG. 13 is a plot of the absorption kinetics of FC-76 alloy powders having two different particle sizes.

FIG. 13 is a plot of the absorption kinetics of FC-76 alloy powders having two different particle sizes. Specifically, weight % hydrogen absorption versus time is plotted for material having a particle size range of 75–250 microns (○symbol), and 32–63 microns (◇ symbol). As can be seen, the smaller particle size greatly enhances the absorption kinetics.

Figure 14:
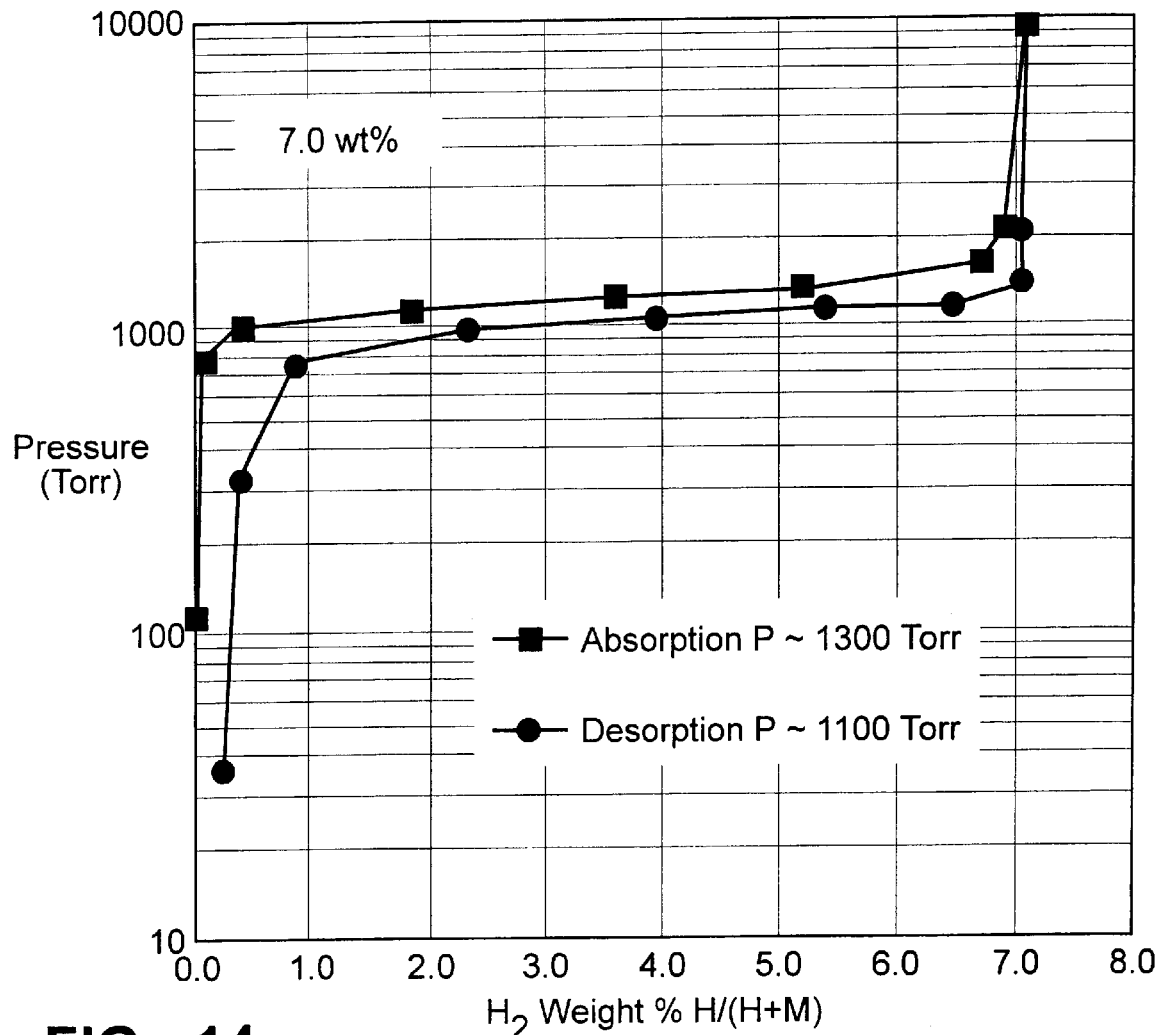
FIG. 14 is a graphical plot of the absorption and desorption PCT curves for a 7% Ovonic thermal hydrogen storage alloy according to the instant invention, specifically to be noted is the lack of any major hysteresis of this material.

FIG. 14 is a graphical plot of the absorption (■ symbol) and desorption (● symbol) PCT curves at 300° C. for a 7 weight % storage capacity Ovonic thermal hydrogen storage alloy according to the instant invention. It should be noted that this material lacks any major hysteresis. That is, virtually all of the absorbed hydrogen is recovered upon desorption. Thus hydrogen storage in this alloy is completely reversible.

While the method of forming the hydrogen storage alloy powders in the examples above was rapid solidification and subsequent grinding, gas atomization may also be used. When the materials are ground, use of an attritor is the preferred method of grinding. Particularly useful is the addition of a grinding agent, such as carbon, when grinding these alloys.

The hydrogen storage subsystem 34 includes a metal hydride hydrogen storage means for storing hydrogen within a container or tank. In one embodiment of the present invention, the storage means comprises a afore described hydrogen storage alloy material physically bonded to a support means. Generally, the support means can take the form of any structure that can hold the storage alloy material. Examples of support means include, but are not limited to, mesh, grid, matte, foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydrogen storage alloy material may be physically bonded to the support means by compaction and/or sintering processes. The alloy material is first converted into a fine powder. The powder is then compacted onto the support means. The compaction process causes the powder to adhere to and become an integral part of the support means. After compaction, the support means that has been impregnated with alloy powder is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to the support means.

Figure 15:
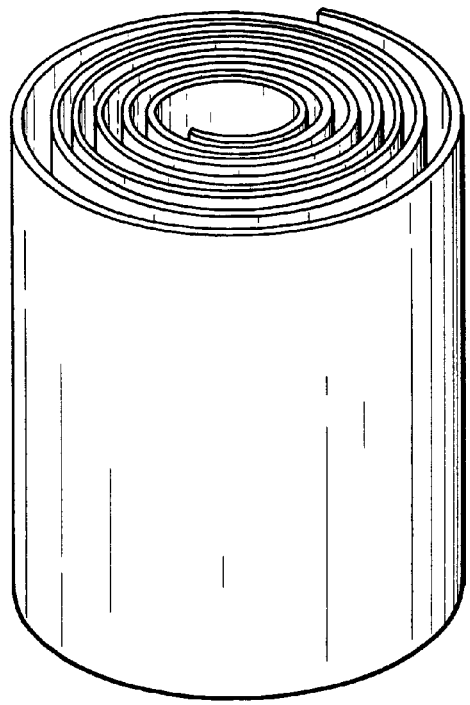
FIG. 15 shows an embodiment of the instant invention where a support means bonded with the hydrogen storage alloy material is spirally wound into a coil.
Figure 16:
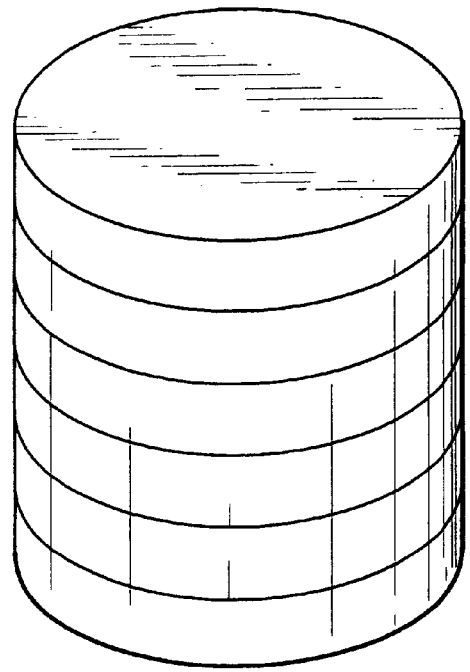
FIG. 16 shows an alternate embodiment of the instant invention where a support means bonded with the hydrogen storage alloy material is assembled as a plurality of stacked disks.

The support means/alloy material can be packaged within the container/tank in many different configurations. FIG. 15 shows a configuration where the support means/alloy material is spirally wound into a coil. FIG. 16 shows an alternate configuration where the support means/alloy material is assembled in the container as a plurality of stacked disks. Other configurations are also possible (e.g. stacked plates).

Compacting and sintering alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the support means throughout the interior of the container provides for an even temperature and heat distribution throughout the bed of alloy material. This results in a more uniform rates of hydrogen absorption and desorption throughout the entirety thereof, thus creating a more efficient energy storage system.

One problem when using just an alloy powder (without a support means) in hydrogen storage beds is that of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

Yet another problem with using just an alloy powder (without a support means) in hydrogen storage beds or when using high-flow-rate hydrogen cooling, is that as the particles of the hydrogen storage material break up under the stresses of expansion and contraction during cycling, some of the particles can become entrained in the hydrogen flow, especially when using high-flow-rate hydrogen cooling. While the bonding technique above can alleviate this problem somewhat, a better design would be to eliminate the interaction of "flowing" hydrogen with the storage material. That is, a bed design in which the hydrogen does not flow past the storage material with enough velocity to entrain the particles is desirable. One such design is described herein below.

A Novel Hydride Storage Bed Design

Figure 17:
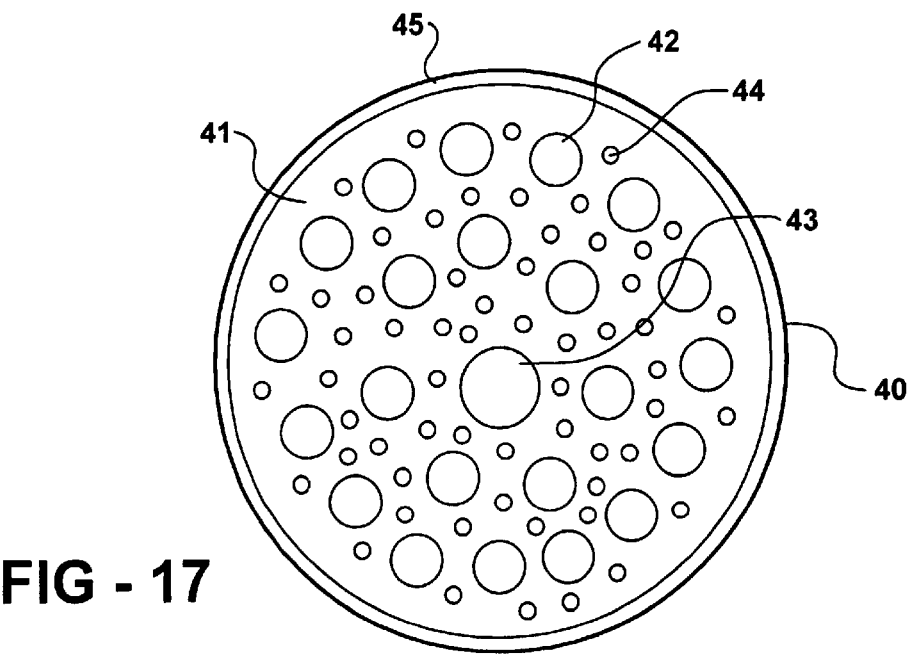
FIG. 17 shows a unique hydride storage bed design which is useful in the infrastructure of the instant invention, and is specifically useful for high-flow-rate hydrogen cooling of the hydrogen absorbing material therein.

FIG. 17 is a graphical representation of a cross-section of a bed 40 for the storage of hydrogen in a hydrogen storage alloy. The bed 40 includes a support/heat-transfer component 41, which is made from a highly porous, high thermal conductivity, solid material. The preferred material is a high thermal conductivity graphitic foam, such as those disclosed by James Klett in "Composites in Manufacturing", Volume 15, No. 4, Fourth Quarter (1999). These materials have thermal conductivities of 50 to 150 W/m-K with densities as low as (i.e., highly porous) 0.27 to 0.57 g/cm$^3$. Thus, these graphitic materials are very conductive, very porous and thus very light weight. Additionally, this graphitic carbon material may, itself, store additional hydrogen. The graphitic foam material may also be doped with p-orbital materials such as an alkali metals (e.g., lithium, sodium or potassium) or chalcogen elements (e.g., tellurium, selenium or sulfur), thereby enhancing the hydrogen storage capabilities of the graphitic material.

The thermal hydrogen storage alloy materials are formed into rods or pellets 42 via sintering/compression and inserted into pre-drilled holes in the graphitic support 41. The instant bed design alleviates prior art problems with disintegration of the shaped hydride absorbing body in that, ultra-small particle size powders may be used to create the sintered/pressed pellets or rods. Hence, since the pressed form is already composed of particles that are less than 50 microns or so in size, very little additional fracturing/disintegration will occur. Additionally, as stated herein below, any particles of the alloy which may dislodge from the pressed rods or pellets are not likely to be entrained in the flow of hydrogen.

The center (and other locations if necessary) may be fitted with a heater 43 of some sort to facilitate the heating of the storage bed (for desorbing hydrogen). This heater may be in the form of an electric heater or a catalytic combustor which burns hydrogen and releases the heat into the bed. Alternatively, current may be passes directly through the graphitic support 41 resulting in heat being created in the bed by resistance heating by the graphite itself.

To introduce and remove hydrogen from the system, holes or channels 44 may be drilled through the length of the bed. Hydrogen in introduced into the bed under pressure through these channels 44. Some of the hydrogen flows through the porous network of the graphitic support 41 and is adsorbed by the hydrogen storage material 42. If the flow rate of hydrogen is high, as it is when cooling via high-rate-flow hydrogen cooling, much of the hydrogen passes through the holes 44 and out the other end of the bed 40.

This system is uniquely designed for high-flow-rate hydrogen cooling in that the excess flow of hydrogen, which passes though the bed at a very high rate of speed, never contacts the hydrogen storage materials directly. Thus, any particles of the alloy which may dislodge from the pressed rods or pellets are not likely to be entrained in the high-speed flow of hydrogen. However, efficient heat transfer to the excess hydrogen is insured, via the high thermal conductivity support 41. That is, heat is transfered from the hydrogen storage material 42, to the support 41 and finally to the high-speed/high-flow-rate hydrogen in channels 44, and is carried out of the bed (for reuse elsewhere in the infrastructure system). The design can also be equipped with thermal insulation 45 surrounding the bed to insulate the bed from heat losses during desorption.

The Hydrogen Transportation Subsystem 35

Once the hydrogen has been stored in hydride tanks at subsystem 34, the hydrogen needs to be transported from one location to another. This is achieved via conventional shipping of storage tanks full or hydrided hydrogen storage alloy. Since, these tanks are completely safe from risks of fire and explosion, it will be a simple matter to transport them via conventional shipping means. These include shipment via any or all of truck, train, boat, or barge. The tanks can be handled and stowed conventionally, such as via tank racks or other means for securing them to their transport vehicle.

The Hydrogen Distribution Network Subsystem 36

After the hydrogen is transported, subsystem 35 it is delivered to a distribution network. This distribution network includes hydrogen storage facilities including vehicle refueling stations, home use distributors and industrial/ business distributors. When the hydrogen tanks arrive (via boat, barge, truck, train, etc.,) the hydrogen can be handled in one of two ways. First the storage tanks (or cylinders, etc.) can physically be offloaded to the distributor (or a truck trailer can be left behind) and the empty tanks, from which hydrogen has already been distributed, can be retrieved for refueling. Otherwise, hydrogen can be transferred from the transported storage tanks to a fixed storage tank (also preferably a hydride storage bed) at the distributor's location.

The Hydrogen End-Use Subsystem 37

Finally, the hydrogen which is stored at the facilities of the distribution network 36 is transferred to the final consumer. The final consumer use may be for powering a vehicle, in which case the consumer would refill the vehicle at a refueling station. The final use may also be a home use such as those already using natural gas (e.g., for heating, hot water, cloths drying, cooking, etc.). In this case, the hydrogen may be delivered to the home and stored in a hydride storage tank onsite, or the hydrogen may be piped into the home via a local pipeline distribution network (much more economical than a nationwide distribution network because of long distance pressure requirements and losses). Finally the end use may be of a business or industrial nature. Again, the options for this consumer would be delivery to the site and onsite storage, or local pipeline distribution.

Hydrogen Powered Internal Combustion Engine and Fuel Cell Vehicles

The instant alloys, storage material systems and infrastructure are useful as hydrogen supplies for many applications. One such application is the field of automobiles. Specifically, infrastructure system can be used as a means to supply hydrogen to automobiles and the storage systems can be used as a source of hydrogen for internal combustion engine (ICE) or fuel cell (FC) of such vehicles.

Figure 18:
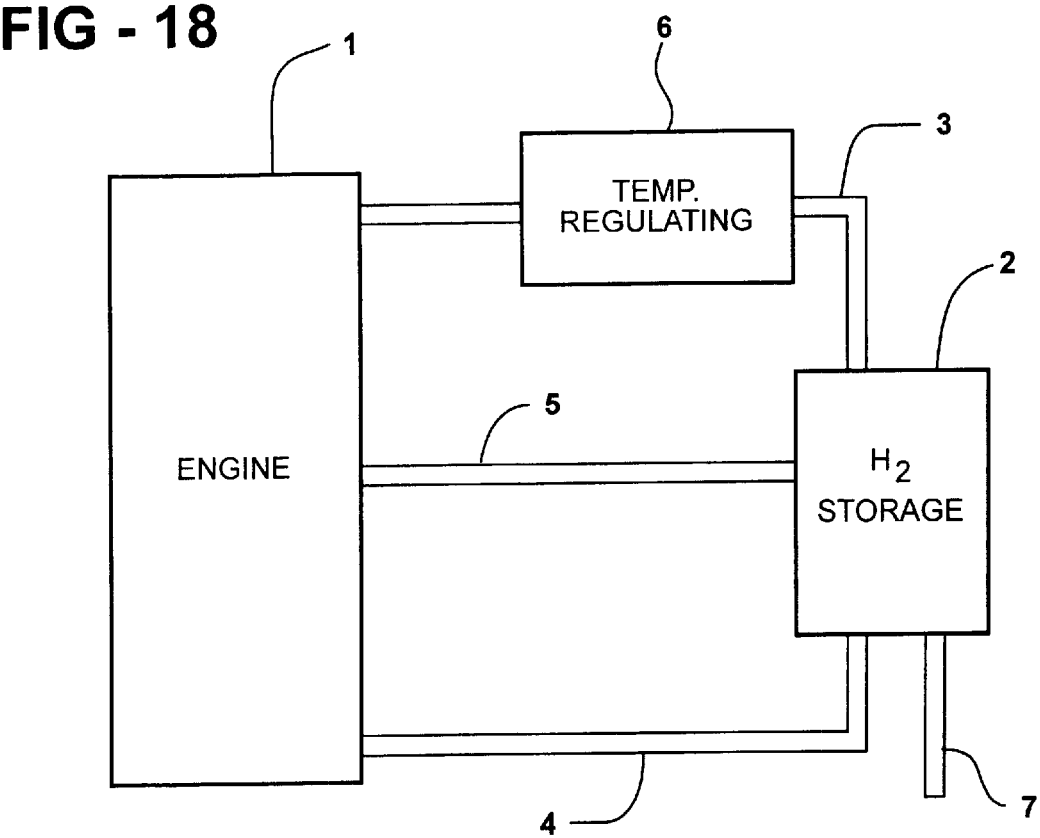
FIG. 18 shows a schematic representation of a hydrogen gas supply system for powering an internal combustion engine vehicle.

FIG. 18 shows a schematic representation of a hydrogen gas supply system for an ICE vehicle, which is for supplying a hydrogen engine 1 with hydrogen gas. The system has a hydrogen gas storage portion 2 and an engine waste heat transfer supply passage 3 which leads engine waste heat (in the form of exhaust gas or engine coolant) discharged from the engine 1 to the hydrogen gas storage portion 2. The system also includes a return passage 4 for returning any engine coolant used to heat the hydrogen storage material back to the engine 1 and an exhaust gas vent 7 for releasing used exhaust gas. The system further includes a hydrogen gas supply passage 5 which leads hydrogen gas from the hydrogen gas storage portion 2 to the engine 1. The engine waste heat transfer supply passage 3 is provided with a temperature regulating portion 6 which regulates the temperature of the waste heat to be introduced into the hydrogen gas storage portion 2. With such a system, waste heat generated within the ICE can be efficiently used to heat the hydrogen storage material to release hydrogen therefrom for use in the ICE.

Figure 19:
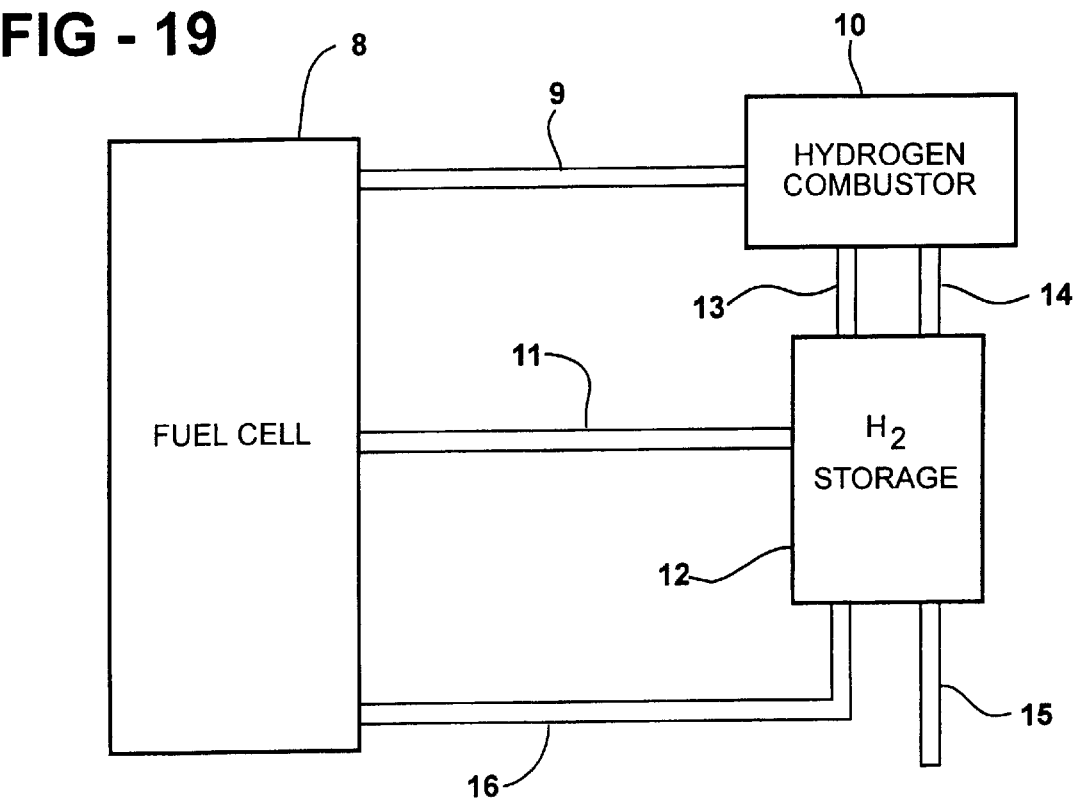
FIG. 19 shows a schematic representation of a hydrogen gas supply system for powering for a fuel cell vehicle.

FIG. 19 shows a schematic representation of a hydrogen gas supply system for an FC vehicle, which is for supplying a fuel cell 8 with hydrogen gas. The system has a hydrogen gas storage portion 12 and a fuel cell waste heat/hydrogen transfer supply passage 9 which leads fuel cell waste heat and unused hydrogen discharged from the fuel cell 8 to a hydrogen gas combustor 10. Waste heat from the fuel cell may be in the form of heated gases or heated aqueous electrolyte. The hydrogen combustor 10, heats a thermal transfer medium (preferably in the form of the aqueous electrolyte from the fuel cell) utilizing waste heat from the fuel cell 8, and by combusting hydrogen. Hydrogen is supplied to the combustor 10 via unused hydrogen from the fuel cell 8, and via fresh hydrogen supplied from the hydrogen storage unit 12 via hydrogen supply line 14. Heated thermal transfer medium is supplied to the hydrogen storage unit 12 via supply line 13. The system also includes a return passage 16 for returning any fuel cell aqueous electrolyte used to heat the hydrogen storage material back to the fuel cell 8 and an exhaust gas vent 15 for releasing used combustor gas. The system further includes a hydrogen gas supply passage 11 which leads hydrogen gas from the hydrogen gas storage unit 12 to the fuel cell 8.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen storage bed capable of storing and releasing hydrogen comprising:
   a hydrogen storage alloy material;
   a solid support means having a high porosity and a high thermal conductivity, wherein said solid support means holds said hydrogen storage alloy material in a fixed position;
   a plurality of hydrogen flow channels configured to:
   1) transport hydrogen into and thermal energy out of said hydrogen storage alloy material during storage of hydrogen therein; and
   2) transport hydrogen out of and thermal energy into said storage alloy material during release of hydrogen therefrom.

2. The hydrogen storage bed of claim 1, wherein said high porosity, high thermal conductivity, solid support means is formed from a high thermal conductivity graphitic foam.

3. The hydrogen storage bed of claim 2, wherein said high thermal conductivity graphitic foam has a thermal conductivity of 50 to 150 W/m-K.

4. The hydrogen storage bed of claim 3, wherein said high thermal conductivity graphitic foam has densities as low as 0.27 to 0.57 g/cm$^3$.

5. The hydrogen storage bed of claim 2, wherein said hydrogen storage alloy material is in the form of compressed pellets or rods which are inserted into pre-drilled holes in said high thermal conductivity graphitic foam.

6. The hydrogen storage bed of claim 2, wherein said bed further includes at least one bed heater for heating said hydrogen storage alloy material during the release of said hydrogen, said at least one heater positioned within pre-drilled holes in said high thermal conductivity graphitic foam.

7. The hydrogen storage bed of claim 6, wherein said at least one heater is an electrical heater.

8. The hydrogen storage bed of claim 6, wherein said at least one heater is catalytic hydrogen combustor.

9. The hydrogen storage bed of claim 2, wherein said hydrogen flow channels are pre-drilled into said high thermal conductivity graphitic foam and carry thermal energy into or out of said bed via heat exchange with high-flow-rate hydrogen.

10. The hydrogen storage bed of claim 1, wherein said bed further includes thermal insulation surrounding said bed to prevent thermal losses during the release of said hydrogen.

* * * * *